United States Patent Office 2,771,963
Patented Nov. 27, 1956

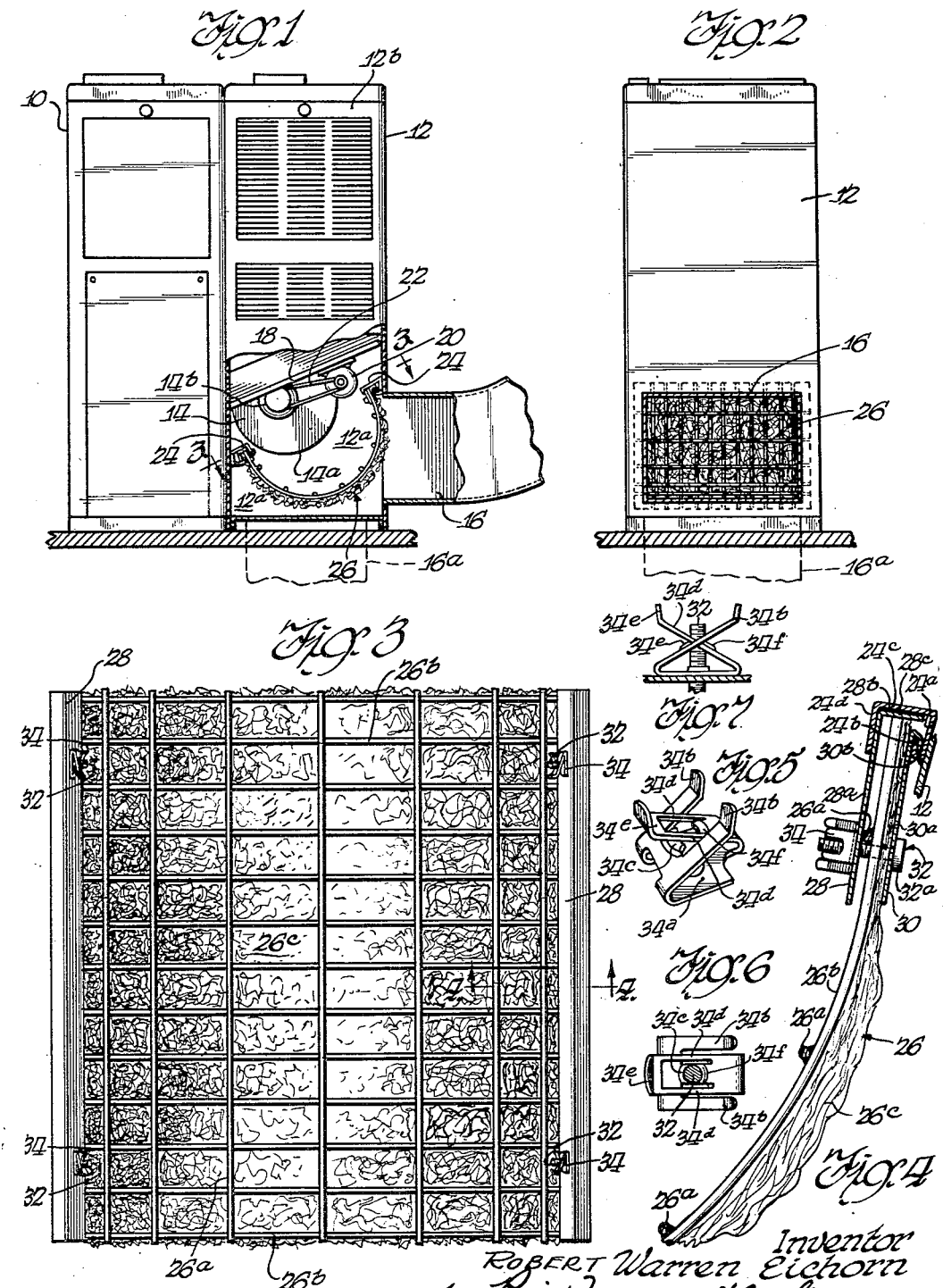

2,771,963

AIR CONDITIONING UNIT AND AIR FILTER THEREFOR

Robert Warren Eichorn, Marshalltown, Iowa, assignor to Lennox Industries, Inc.

Application December 24, 1953, Serial No. 400,228

2 Claims. (Cl. 183—49)

This invention relates to an improved air conditioning unit and air filter therefor which afford flexibility with respect to an intake duct location; large filter area in relation to cabinet size, with the incident lower air resistance; convenience of filter installation and cleaning, together with automatic sealing effect between the filter and the adjacent housing; low replacement expense because mounted filters need not be used; and smaller overall unit size because of the nesting provided between the filter and blower.

In the apparatus herein described, the air conditioning unit has a vertical tube through which air is drawn in conventional fashion by a blower located on a horizontal axis and having a generally cylindrical housing. The air filter in the form of a semi-cylinder is removably mounted in the housing of the air conditioning unit and in nesting relation to the blower. The filter is sustained in this position by marginal hooks which are slidable on and receive rails mounted on the unit and adapted to fit into the hooks. The rails have hood portions which overlay the ends of the filter and extend partially along the concave face thereof to define an air tight seal. The housing of the air conditioning unit has a removable side panel which exposes the side adjacent the filter to insert and remove the same.

The filter unit is itself formed by a wire screen or mesh formed in a semi-cylindrical conformation. At each of the flat or non-arcuate ends thereof the screen is clamped by a pair of end plates releasably held in position by bolts and releasable spring nuts. These nuts are formed from spring strips bent reversely to bear resiliently against the opposite sides of the bolts, thereby to anchor the end plates in position. The filter material, which may, for example, be in the form of a pad of glass wool, is seated against one face of the wire screen and sandwiched thereagainst by the end plates.

In the unit above described it is possible to locate the intake duct below or on either side of the filter, thus the unit is flexible and can be accommodated to varying local conditions with respect to the location of intake air ducts and desired orientation of the air conditioning unit. The unit also saves space because the semi-cylindrical filter nests with the blower housing, which is usually of cylindrical shape. In other words the blower housing extends in part within the confines of the filter and thus the space required for both is less than the space required for each separately. The unit also is inexpensive since the filter padding may be purchased in unsupported form as distinguished from being confined within a carrier as is general practice. The user can readily cut a sheet of filter material as required and clamp the same to the wire screen forming the support for the filter. This operation is facilitated by the rail supports for the filter and the removable panel provided in alignment with the same so that the filter can be readily inserted and removed.

It is therefore an object of the present invention to provide an improved air conditioning unit characterized by flexibility as to intake air duct location and a filter therefor.

It is another object of the invention to provide an improved air conditioning unit wherein a filter unit of comparatively large filter area is provided and a filter therefor.

Another object of the present invention is to provide an improved air conditioning unit wherein the filter nests with the blower to minimize space requirements and a filter therefor.

Still another object of the present invention is to provide an improved air conditioning unit having an air filter which is readily removed and can be readily replaced with a new clean unsupported filter pad to the end that maintenance expense and trouble is minimized and a filter therefor.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawings, in which:

Figure 1 is a view from the front of a combined heating and cooling air conditioning unit constructed in accordance with the present invention with parts broken away to show the construction more clearly;

Figure 2 is an end elevational view of the apparatus of Figure 1;

Figure 3 is an enlarged cross-sectional view through axis 3—3, Figure 1;

Figure 4 is a fragmentary enlarged cross-section view through axis 4—4, Figure 3 and showing in addition one rail which receives and supports the filter;

Figure 5 is a view in perspective of the releasable spring nut of the apparatus;

Figure 6 is a top plan view of the nut of Figure 5 and showing in cross-section the bolt upon which it is received;

Figure 7 is a side elevational view of the nut of Figures 5 and 6.

Referring now to Figure 1 there are shown at 10 and 12 respectively the portions of a two-unit heating and cooling air conditioner intended for domestic use. Unit 10 may, for example, include air cooling equipment with the requisite controls therefor. Unit 12 may, for example, include a gas burner or other air heating unit with requisite controls.

The bottom portion of the unit 12 forms an air duct indicated generally at 12a. Air taken into this duct is propelled upwardly by the centrifugal blower 14 which discharges air in an upward direction through a suitable secondary duct (not shown) to pass through the heating mechanism located in unit 12 or the cooling mechanism in unit 10, or both, as desired. Suitable outlet ducts (not shown) are provided to convey the discharged air to the house. Air is taken into the duct 12a and hence into the blower 14 by intake pipe 16 which is shown in Figure 1 as entering from the right hand side of the unit 12. As hereinafter described in detail, the intake duct 16 may enter from beneath the unit 12 as shown by the dotted lines 16a, Figures 1 and 2, or it may enter on the left hand side of unit 12, all in accordance with the desire of the user.

The blower 14 is a conventional centrifugal blower. It includes a generally cylindrical housing 14a which is disposed on a horizontal axis within the duct 12a and is supported by the sloping bracket 18 which is anchored at its opposite ends to the side walls of the housing portion of unit 12. The blower 14 has an impeller (not shown) which draws air into the housing 14a through the intake opening 14b. This impeller is driven by motor 20 which is slung from the bracket 18 and drives the impeller through the belt 22.

The walls of the housing of unit 12 have a pair of spaced channeled guide rails 24 located in generally parallel relation to the axis of blower housing 14a. One of these rails is shown in detail in Figure 4. It consists of a base portion 24a which is riveted or otherwise affixed to the wall of housing 12 and an upstanding tongue portion 24b which extends in generally upward direction and in spaced relation to the base portion 24a. The rail further has a sloping hood 24c which extends over portion 24b and terminates in a depending flange 24d which overlays the concave face of the filter unit 26 described in detail hereafter.

The filter unit 26 consists of a wire mesh or screen formed by the crossed wires 26a and 26b, Figures 3 and 4, which are welded or otherwise affixed to each other to form a unitary structure which is bent to a semi-cylindrical conformation as shown in Figure 1 to provide a support for filtering material. At each of its straight or non-arcuate ends the screen formed by wires 26a and 26b is clamped by an opposed pair of end plates 28 and 30, Figures 3 and 4. Each of these plates has a flat base portion, 28a and 30a, respectively, which bears against the mesh formed by wires 26a and 26b. The end plate 28 also has an end face 28b which is at right angles with the base portion 28a. As shown in Figure 4, the plate 28 fits beneath the hood portions 24c—24d of the rail 24 to define an air-tight end support. The end plate 30 has a down-turned hook part 30b which receives the upstanding tongue 24b of the rail 24 to support the mesh or screen 26a—26b. The end plates 28—30 are releasably held together by the bolts 32 which are received in suitable holes in the base portions 28a and 30a and are provided with heads 32a which seat against the base portions 30a of the plates 30. The base portion 28a of the plate 28 is held snugly by the spring nuts 34 received on each of the bolts and constructed as described in detail hereafter. The air filtering material 26c—which may be a pad of glass wool—is sandwiched between the plate 30 and the mesh 26a—26b. The filtering material is snugly fitted about the mesh 26a—26b and the plates 28 and 30 drawn tightly together to secure the mesh in snug position.

The housing of unit 12 has a panel 12b which is removably secured to the face of the unit as seen in Figure 1. When this panel is removed, the filter unit 26 is exposed and the filter may be removed by simply pulling it out of the unit. The filter may be replaced in similar fashion.

The construction of the spring nut 34 is shown in detail in Figures 5, 6, and 7. As shown, the unit consists of a sheet of spring steel which is stamped out and bent to define a base 34a from which a pair of spaced sloping outer ears 34b extend upwardly and at an angle. Tongue 34c extends between ears 34b so as to move up and down as these ears are flexed in relation to the base 34a. The tongue 34c has a concave end face which, as shown in Figure 6, bears against the bolt 32. On the opposite side of the base 34a and between the ears 34b, the spring nut has a pair of ears 34d which are bridged at their outer end by a web 34e. A tongue 34f extends between ears 34d so as to move in relation to base 34a as the web 34e is pressed toward base 34a. The tongue 34f terminates in a concave end face which bears against the bolt 32 on the side opposite the tongue 34c.

Under normal conditions the tongue portions 34c and 34f of the spring nut 34 tend to flex upwardly and snugly engage the threads of the bolts 32, thus securing the end plates 28 and 30 in place. To release the nuts 34 it is merely necessary to flex ears 34b and web 34e in the downward direction until the tongues clear the threads of the bolt. The nut may then be removed without turning. By similarly flexing the ears 34b and web 34e the unit may be applied without turning.

It will be noted that the housing 14a of the blower 14 extends within the confines of the filter unit 26. Thus the total space in duct 12a required for these separate units is less than the total space requirements of the units separately. As a consequence, the space requirement of the unit is minimized. Despite this nesting effect, the total area of the filter 26 through which air is drawn is comparatively large and considerably greater than the cross-section area of the duct 12a.

The semi-cylindrical conformation of the filter 26 makes it possible to connect the intake duct 16 on the side of unit 12, as shown in the solid lines of Figure 1, or, if desired, at the bottom of the unit 12. Insofar as the efficiency of the filter is concerned it is a matter of indifference whether the duct is connected in one position or the other. Moreover, if it is desired to connect the duct 16 to the side opposite of that of Figure 1, this can also be done, although in the particular installation of Figure 1, the cooling unit 10 interferes with this arrangement.

While I have shown and described a particular embodiment of the present invention it will be understood that various modification and alternative constructions may be made without departing from the spirit and scope thereof. I therefore intend by the appended claims to cover all modifications and alternative constructions which fall within their true spirit and scope.

What I claim as new and desire to secure by Letters Patent of the United States is:

1. An air conditioning unit comprising in combination: a housing defining a vertically extending tube; means to impel air vertically through the tube to condition the same; an air filter of generally semi-cylindrical conformation disposed within the tube and oriented to receive air flow on its convex side and having marginal portions in the form of downturned hooks; and rails on the housing having tongue portions received in the marginal portions of the filter, the rails further having imperforate hood portions extending over the ends of filter and partially along the concave face thereof to form a seal.

2. An air filter of generally semi-cylindrical shape adapted to fit into the intake air tube of an air conditioning unit, the filter comprising: a wire support screen of generally semi-cylindrical shape and straddled at each non-arcuate end by a pair of end plates; a sheet of air filter material located on one side of the wire support screen and clamped between the pair of end plates at each end of the screen, the air filter material being otherwise unsupported; each pair of end plates being releasably held in clamping position by bolts having headed ends seating on one end plate and a spring release nut seating on the other end plate, the nut comprising spring metal sheet bent reversely to bear resiliently against opposite sides of the bolt and having extending ears by which the spring force can be manually overcome to release the same.

References Cited in the file of this patent

UNITED STATES PATENTS

| | | |
|---|---|---|
| 1,598,097 | Mathis | Aug. 31, 1926 |
| 1,847,609 | Harnett | Mar. 1, 1932 |
| 1,862,659 | Christofferson | June 14, 1932 |
| 2,081,553 | Neeson | May 25, 1937 |
| 2,160,269 | Jorolemon | May 30, 1939 |
| 2,265,272 | Ditzler | Dec. 9, 1941 |
| 2,337,518 | Young et al. | Dec. 21, 1943 |
| 2,621,755 | Gray | Dec. 16, 1952 |
| 2,674,934 | Tutt | Apr. 13, 1954 |